(12) United States Patent
Yun et al.

(10) Patent No.: US 11,881,357 B2
(45) Date of Patent: Jan. 23, 2024

(54) MULTILAYER CAPACITOR

(71) Applicant: SAMSUNG ELECTRO-MECHANICS CO., LTD., Suwon-si (KR)

(72) Inventors: Tae Ho Yun, Suwon-si (KR); Su Bong Jang, Suwon-si (KR); Sang Jong Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 28 days.

(21) Appl. No.: 17/702,237

(22) Filed: Mar. 23, 2022

(65) Prior Publication Data

US 2023/0197348 A1 Jun. 22, 2023

(30) Foreign Application Priority Data

Dec. 22, 2021 (KR) .......................... 10-2021-0185228

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/1218* (2013.01)

(58) Field of Classification Search
CPC .......... H01G 4/30; H01G 4/008; H01G 4/012; H01G 4/1218
See application file for complete search history.

(56) References Cited

U.S. PATENT DOCUMENTS 9,343,231 B2 5/2016 Chai et al.
2007/0207394 A1* 9/2007 Dersch ............... G03F 7/70433
430/30

(Continued)

FOREIGN PATENT DOCUMENTS

| JP | 5-166667 A | 7/1993 |
| JP | 4276642 B2 | 6/2009 |
| KR | 10-2009-0047281 A | 5/2009 |

*Primary Examiner* — Michael P McFadden
(74) *Attorney, Agent, or Firm* — Morgan, Lewis & Bockius LLP

(57) ABSTRACT

A multilayer capacitor includes: a body including a stack structure in which a first internal electrode and a second internal electrode are stacked on each other interposing a dielectric layer therebetween; and first and second external electrodes disposed on the body to be respectively connected to the first internal electrode and the second internal electrode. One of the first internal electrode and the second internal electrode includes a recess portion disposed in one surface thereof, and providing a deviation in a distance between the first and second internal electrodes, $T_D$ indicates a thickness of a portion of the dielectric layer, based on a portion positioned on the one surface and not in the recess portion, $T_R$ indicates a recession depth of a portion positioned on the one surface and recessed by the recess portion, and $(T_R/T_D)$ is greater than zero and less than ($\frac{1}{2}$).

19 Claims, 14 Drawing Sheets

(51) Int. Cl.
*H01G 4/12* (2006.01)
*H01G 4/012* (2006.01)

(56) References Cited

U.S. PATENT DOCUMENTS

| | | | | |
|---|---|---|---|---|
| 2012/0073129 | A1* | 3/2012 | Abe | H01G 4/30 |
| | | | | 29/825 |
| 2013/0250476 | A1* | 9/2013 | Chung | H01G 4/232 |
| | | | | 156/89.16 |
| 2013/0279074 | A1* | 10/2013 | Lee | H01G 4/30 |
| | | | | 29/25.42 |
| 2014/0022698 | A1* | 1/2014 | Jeong | H01G 4/30 |
| | | | | 361/321.2 |
| 2015/0380159 | A1* | 12/2015 | Lee | H01G 4/012 |
| | | | | 156/89.12 |

* cited by examiner

A-A'

MULTILAYER CAPACITOR

CROSS-REFERENCE TO RELATED APPLICATION(S)

This application claims benefit of priority to Korean Patent Application No. 10-2021-0185228 filed on Dec. 22, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor has been widely used as a component of an electronic device such as a computer, a personal digital assistant (PDA), a mobile phone because the multilayer capacitor has a small size, implements a high capacitance and may be easily mounted, and has also been widely used as a component of an electric device (including a vehicle) because the multilayer capacitor has high reliability and high strength characteristic.

SUMMARY

An aspect of the present disclosure may provide a multilayer capacitor capable of efficiently-improving performance (e.g., capacitance or miniaturization) thereof.

According to an aspect of the present disclosure, a multilayer capacitor may include: a body including a stack structure in which a first internal electrode and a second internal electrode are stacked on each other interposing a dielectric layer therebetween; and first and second external electrodes disposed on the body while being spaced apart from each other to be respectively connected to the first internal electrode and the second internal electrode. One of the first internal electrode and the second internal electrode may include a recess portion disposed in a first surface of the one of the first internal electrode and the second internal electrode, and providing a deviation in a distance between the first and second internal electrodes, $T_D$ may indicate a thickness of a portion of the dielectric layer, based on a portion positioned on the first surface and not in the recess portion, $T_R$ may indicate a recession depth of a portion positioned on the first surface and recessed by the recess portion, and ($T_R/T_D$) may be greater than zero and less than (½).

According to an aspect of the present disclosure, a multilayer capacitor may include: a body including a stack structure in which a first internal electrode and a second internal electrode are stacked on each other interposing a dielectric layer therebetween; and first and second external electrodes disposed on the body while being spaced apart from each other to be respectively connected to the first internal electrode and the second internal electrode. One of the first internal electrode and the second internal electrode may include a recess portion disposed in a first surface of the one of the first internal electrode and the second internal electrode, and providing a deviation in a distance between the first and second internal electrodes, $T_D$ may indicates a thickness of a portion of the dielectric layer, based on a portion positioned on the first surface and not in the recess portion, $W_R$ may indicate a linear width of at least one of portions of the one of the first internal electrode and the second internal electrode, recessed by the recess portion, and ($W_R/T_D$) may be greater than zero and less than (½).

According to another aspect of the present disclosure, a multilayer capacitor may include: a body including a stack structure in which a first internal electrode and a second internal electrode are alternately stacked on each other interposing a dielectric layer therebetween; and first and second external electrodes disposed on the body while being spaced apart from each other to be respectively connected to the first internal electrode and the second internal electrode. One of the first internal electrode and the second internal electrode may include a recess portion disposed in a first surface of the one of the first internal electrode and the second internal electrode, and providing a deviation in a distance between the internal electrodes, $W_R$ may indicate a linear width of at least one of portions of the one of the first internal electrode and the second internal electrode, recessed by the recess portion, $T_R$ may indicate a recession depth of a portion positioned on the first surface and recessed by the recess portion, and $W_R$ may be greater than $T_R$.

According to another aspect of the present disclosure, a multilayer capacitor may include: a body including a stack structure in which a first internal electrode and a second internal electrode are stacked on each other interposing a dielectric layer therebetween; and first and second external electrodes disposed on the body while being spaced apart from each other to be respectively connected to the first internal electrode and the second internal electrode. One of the first internal electrode and the second internal electrode includes a plurality of recession patterns periodically arranged on a portion of one surface of the one of the first internal electrode and the second internal electrode.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
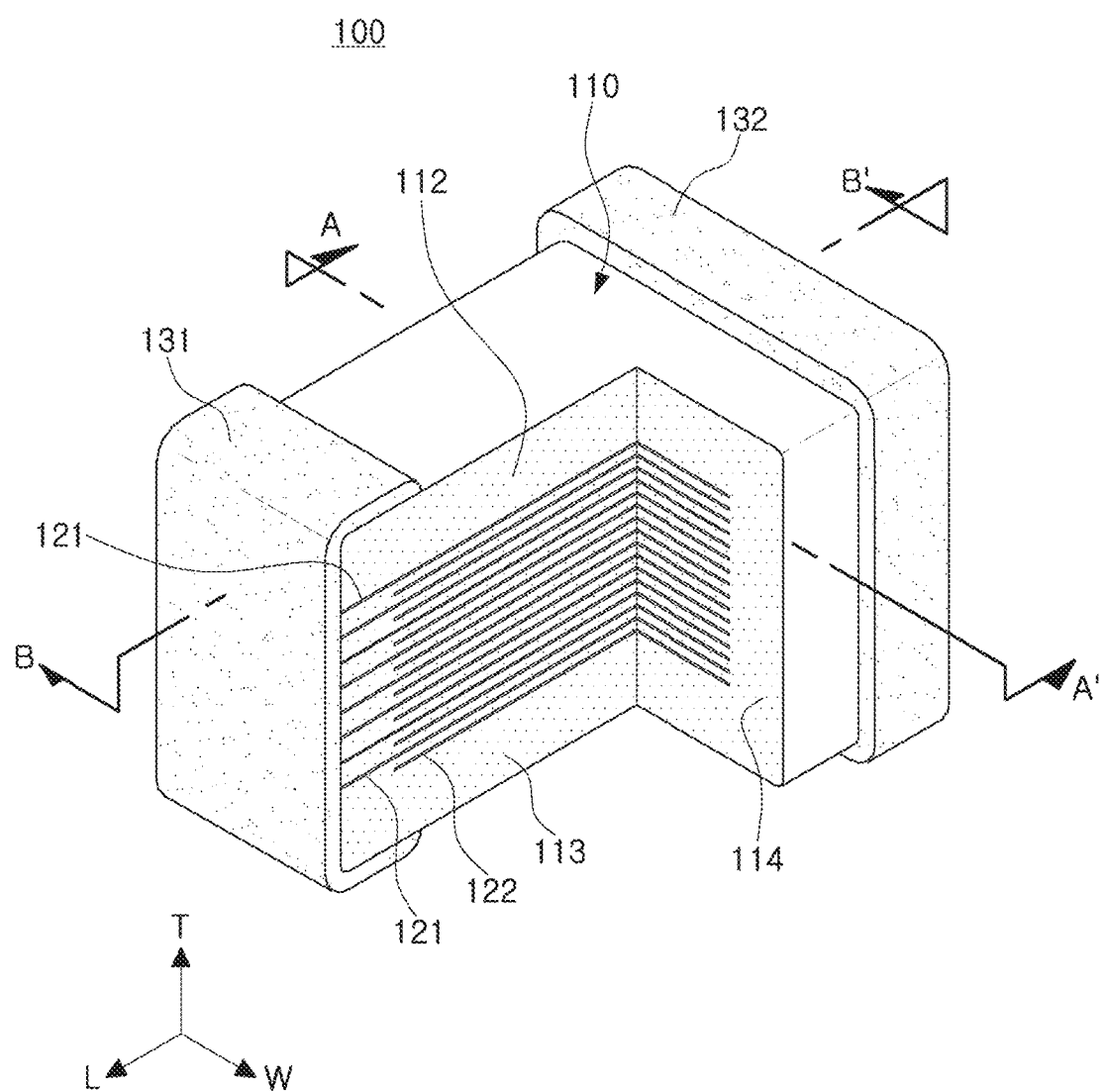
FIG. 1 is a perspective view showing a multilayer capacitor according to an exemplary embodiment of the present disclosure.

Hereinafter, exemplary embodiments of the present disclosure will now be described in detail with reference to the accompanying drawings.

In order to clearly describe exemplary embodiments of the present disclosure, directions of a hexahedron may be defined as follows: an L-direction, a W-direction and a T-direction in the drawings respectively refer to a length direction, a width direction and a thickness direction. Here, the thickness direction may refer to a stack direction (or first direction) in which dielectric layers are stacked.

Hereinafter, the description describes a multilayer capacitor according to an exemplary embodiment of the present disclosure, and in particular, a multi-layer ceramic capacitor (MLCC), and the present disclosure is not limited thereto.

Figure 2:
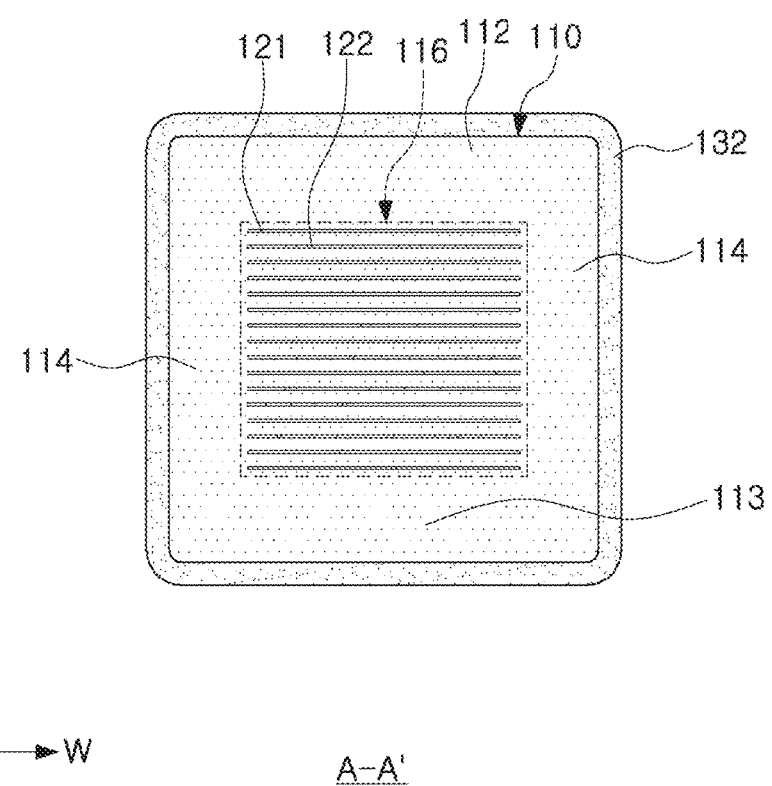
FIG. 2 is a cross-sectional view taken along line A-A' of FIG. 1.
Figure 3:
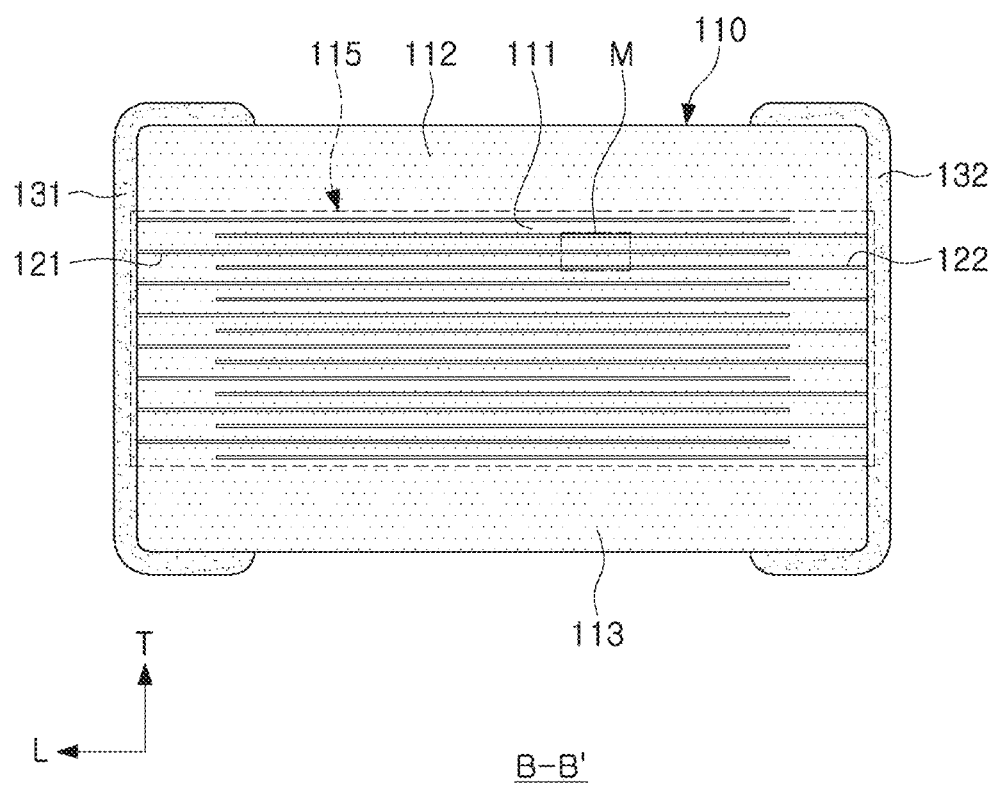
FIG. 3 is a cross-sectional view taken along line B-B' of FIG. 1.

FIG. 1 is a perspective view showing a multilayer capacitor according to an exemplary embodiment of the present disclosure, FIG. 2 is a cross-sectional view taken along line A-A' of FIG. 1, and FIG. 3 is a cross-sectional view taken along line B-B' of FIG. 1. FIG. 1 shows a multilayer capacitor 100 cut by about a ¼ volume to show the inside of a body 110. However, the actual multilayer capacitor 100 may not be cut by about the ¼ volume, and may have a shape approximately symmetrical with respect to each of the L-direction, the W-direction and the T-direction from its center.

Referring to FIGS. 1, 2 and 3, the multilayer capacitor 100 according to an exemplary embodiment of the present disclosure may include the body 110, a first external electrode 131 and a second external electrode 132.

The body 110 may include a stack structure in which at least one first internal electrode 121 and at least one second internal electrode 122 are alternately stacked on each other interposing at least one dielectric layer 111 therebetween in a first direction (e.g., T-direction).

For example, the body 110 may be a ceramic body formed by firing the stack structure. Here, the at least one dielectric layer 111 disposed in the body 110 may be in a sintered state, and a boundary between the dielectric layers adjacent to each other may be integrated to each other, thus making it difficult to confirm a boundary therebetween without using a scanning electron microscope (SEM).

For example, the body 110 may have a shape of a hexahedron having two side surfaces in the length direction (L-direction), two side surfaces in the width direction (W-direction) and two side surfaces in the thickness direction (T-direction), and this hexahedron may have edges/corners polished to each have a round shape. However, the shape and dimension of the body 110 and the stack number of the dielectric layers 111 may not be limited to those described in this exemplary embodiment.

The at least one dielectric layer 111 may have a thickness arbitrarily changed based on a capacitance design of the multilayer capacitor 100, and may include a ceramic powder having high dielectric constant, e.g., barium titanate ($BaTiO_3$) based powder. However, the present disclosure is not limited thereto. In addition, various ceramic additives (e.g., MgO, $Al_2O_3$, $SiO_2$ or ZnO), organic solvents, plasticizers, binders, dispersants or the like may be added to the ceramic powder based on a required specification of the multilayer capacitor 100.

An average particle diameter of the ceramic powder used to form the at least one dielectric layer 111 may not be particularly limited, may be adjusted based on the required specification of the multilayer capacitor 100 (e.g., miniaturization and/or high capacitance required for a capacitor for an electronic device, or high withstand voltage characteristic and/or strong strength required for a capacitor for an electric device), and may be adjusted to 400 nm or less for example.

For example, the at least one dielectric layer 111 may be formed by applying a slurry including the powder such as the barium titanate ($BaTiO_3$) or the like, to a carrier film and then drying the same to prepare a plurality of ceramic sheets. The ceramic sheets may be formed by mixing the ceramic powder, a binder and a solvent with one another to prepare the slurry and then manufacturing the slurry in a shape of the sheet having a thickness of several micrometers by using a doctor blade method, and the present disclosure is limited thereto.

The at least one first internal electrode 121 and the at least one second internal electrode 122 may be formed as follows: conductive pastes each including a conductive metal are printed; arranged along the stack direction (e.g., T-direction) of the dielectric layer to be exposed alternately from one side surface and the other side surface of the body 110 in the length direction (L-direction); and electrically insulated from each other by the dielectric layer interposed therebetween.

For example, the at least one first internal electrode 121 and the at least one second internal electrode 122 may each be formed of a conductive paste for an internal electrode, having an average particle size of 0.1 to 0.2 µm, and including 40 to 50 wt % of conductive metal powder, and the present disclosure is limited thereto. The conductive paste may include single metal powder such as nickel (Ni), copper (Cu), palladium (Pd), silver (Ag), lead (Pb) or platinum (Pt), or an alloy thereof, and the present disclosure is limited thereto.

For example, the conductive paste for an internal electrode may be applied to the ceramic sheets by using a printing method or the like, to form an internal electrode pattern. The printing method of the conductive paste may be a screen printing method, a gravure printing method or the like, and the present disclosure is not limited thereto. For example, two hundred or three hundred ceramic sheets on each of which the internal electrode pattern is printed may be stacked, pressed and sintered to manufacture the body 110.

A capacitance of the multilayer capacitor 100 may be proportional to an area in which the at least one first internal electrode 121 and the at least one second internal electrode 122 overlap each other in the stack direction (e.g., T-direction), proportional to a total stack number of the at least one first internal electrode 121 and the at least one second internal electrode 122, and inversely proportional to a distance between the at least one first internal electrode 121 and the at least one second internal electrode 122. The distance between the internal electrodes may be substantially equal to each thickness of the at least one dielectric layer 111.

The multilayer capacitor 100 may have a larger capacitance compared to its thickness as the distance between the at least one first internal electrode 121 and the at least one second internal electrode 122 is smaller. On the other hand, a withstand voltage of the multilayer capacitor 100 may be higher as the distance between the internal electrodes is increased. Therefore, the distance between the internal electrodes may be adjusted based on the required specification of the multilayer capacitor 100 (e.g., miniaturization and/or high capacitance required for a capacitor for an electronic device, or high withstand voltage characteristic and/or strong strength required for a capacitor for an electric device). Each thickness of the at least one first internal electrode 121 and the at least one second internal electrode 122 may also be changed based on the distance between the internal electrodes.

For example, the multilayer capacitor 100 may be designed so that the distance between the at least one first internal electrode 121 and the at least one second internal electrode 122 are greater than twice the thickness of each electrode when required to have the high withstand voltage characteristic and/or the strong strength. For example, the multilayer capacitor 100 may be designed so that each thickness of the at least one first internal electrode 121 and the at least one second internal electrode 122 is 0.4 µm or less and the total stack number thereof is 400 or more when required to have the miniature size and/or the high capacitance.

The first and second external electrodes 131 and 132 may be disposed on the body 110 while being spaced apart from each other to be respectively connected to the at least one first internal electrode 121 and the at least one second internal electrode 122.

For example, the first and second external electrodes 131 and 132 may each be formed by using a method of dipping the external electrodes into a paste including a metal component, a method of printing the conductive paste, a sheet transfer method, a pad transfer method, a sputter plating method, an electrolytic plating method, etc. For example, the first and second external electrodes 131 and 132 may each include a fired layer formed by firing the paste and a plating layer formed on an outer surface of the fired layer, and may further include a conductive resin layer disposed between the fired layer and the plating layer. For example, the conductive resin layer may be formed as a thermosetting resin such as epoxy includes a conductive particle. The metal component may be a single component such as copper (Cu), palladium (Pd), platinum (Pt), gold (Au), silver (Ag), lead (Pb) ortin (Sn), or an alloy thereof, and the present disclosure is not limited thereto.

The multilayer capacitor 100 may be mounted or embedded in an external board (e.g., printed circuit board), and may be connected to at least one of the wiring, land, solder and bump of the external board through the first and second external electrodes 131 and 132 to be electrically connected to a circuit (e.g., integrated circuit or processor) electrically connected to the external board.

Referring to FIGS. 1, 2 and 3, the body 110 may include an upper cover layer 112, a lower cover layer 113 and a core region 115, and the core region 115 may include a margin region 114 and a capacitance region 116.

The upper and lower cover layers 112 and 113 may be disposed to interpose the core region 115 therebetween in the first direction (e.g., T-direction) and may each have a thickness greater than each thickness of the at least one dielectric layer 111.

Each of the upper and lower cover layers 112 and 113 may prevent an external environmental factor (e.g., moisture, plating solution or foreign material) from infiltrating into the core region 115, may protect the body 110 from external impact, and may also improve bending strength of the body 110.

For example, the upper and lower cover layers 112 and 113 may each include the same material or a different material (e.g., thermosetting resin such as epoxy resin) from the at least one dielectric layer 111.

The capacitance region 116 may include a portion between the at least one first internal electrode 121 and the at least one second internal electrode 122, thus forming the capacitance of the multilayer capacitor 100.

The capacitance region 116 may include the capacitance region in which the at least one first internal electrode 121 and the at least one second internal electrode 122 are alternately stacked on each other interposing the at least one dielectric layer 111 therebetween in the first direction (e.g., T-direction), and may have the same size as the stack structure.

The margin region 114 may be a portion between each boundary line of the at least one first internal electrode 121 and the at least one second internal electrode 122 and the surface of the body 110.

The plurality of margin regions 114 may be disposed to interpose the capacitance region 116 therebetween in a second direction (e.g., W-direction) perpendicular to the first direction (e.g., T-direction). For example, the plurality of margin regions 114 may be formed in a manner similar to that of the at least one dielectric layer 111 (however, in a different stack direction).

The plurality of margin regions 114 may prevent the at least one first internal electrode 121 and the at least one second internal electrode 122 from being exposed from the surface of the body 110 in the second direction (e.g., W-direction), and may thus prevent the external environmental factor (e.g., moisture, plating solution or foreign material) from infiltrating into the at least one first internal electrode 121 and the at least one second internal electrode 122 through the surface of the body in the second direction, thereby improving the reliability and lifespan of the multilayer capacitor 100. In addition, the at least one first internal electrode 121 and the at least one second internal electrode 122 may each be efficiently expanded in the second direction due to the plurality of margin regions 114, and the plurality of margin regions 114 may thus allow the overlapping area between the at least one first internal electrode 121 and the at least one second internal electrode 122 to be increased, thereby contributing to improvement in capacitance of the multilayer capacitor 100.

Figure 4A:
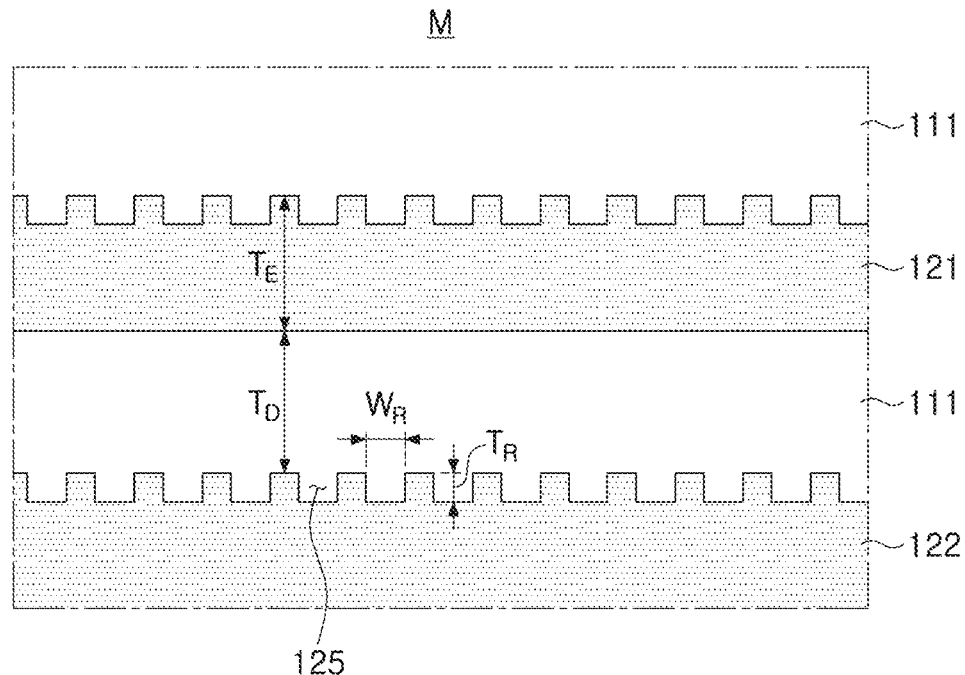
FIG. 4A is an enlarged cross-sectional view of "M" of FIG. 3.

FIG. 4A is an enlarged cross-sectional view of "M" of FIG. 3.

Referring to FIG. 4A, the multilayer capacitor 100 according to an exemplary embodiment of the present disclosure may include a recess portion 125.

The recess portion 125 may be formed on one surface (e.g., upper surface) of the at least one first internal electrode 121 and the at least one second internal electrode 122, and may form a deviation in the distance between the at least one first internal electrode 121 and the at least one second internal electrode 122.

$T_D$ may indicate a distance between the at least one first internal electrode 121 and the at least one second internal electrode 122, based on a portion of the internal electrode, not recessed by the recess portion 125, $T_R$ may indicate a recession depth of a portion of the internal electrode, recessed by the recess portion 125, and $W_R$ may indicate a linear width of at least one of the portions of the internal electrode, recessed by the recess portion 125. $T_E$ may indicate a maximum thickness of the portion of the internal electrode, not recessed by the recess portion 125.

$T_D$, $T_R$, $T_E$ and $W_R$ may have an average value of the distance between the internal electrodes each measured at the portion not recessed by the recess portion 125 and the portion recessed by the recess portion 125, based on a length-thickness (LT) plane exposed by grinding or cutting the body 110 in the W-direction to expose the LT plane including a center point of the body 110. When the LT plane does not include the recess portion 125, $T_D$, $T_R$, $T_E$ and $W_R$ may be measured by using the LT plane obtained by slightly adjusting a grinding time of the body 110 or slightly adjusting a cutting position of the body so that the LT plane includes the recess portion 125. The average value may be a value obtained by integrating a portion corresponding to each of $T_D$, $T_R$, $T_E$ and $W_R$ in a vertical direction, and dividing the same by a total length of the corresponding portion in an integration direction.

$T_D$, $T_R$, $T_E$ and $W_R$ can be measured based on an image which may be obtained by applying the LT plane to analysis using at least one of the micrometer, the transmission electron microscopy (TEM), the atomic force microscope (AFM), the scanning electron microscope (SEM), the optical microscope and the surface profiler. For example, each of $T_D$, $T_R$, $T_E$ and $W_R$ may be measured by visually distinguishing the corresponding portion in the image, and the corresponding portion may be distinguished and measured by classifying pixel values of the image. Here, processing (e.g., filtering or edge detection) of the pixel values of the image may also be accompanied.

The capacitance of the multilayer capacitor 100 may be proportional to a dielectric constant of the at least one dielectric layer 111, may be proportional to the total stack number of the at least one first internal electrode 121 and the at least one second internal electrode 122 and the area in which the at least one first internal electrode 121 and the at least one second internal electrode 122 overlap each other in the first direction (e.g., T-direction), and may be inversely proportional to an average distance between the at least one first internal electrode 121 and the at least one second internal electrode 122. An overall size of the multilayer capacitor 100 may be proportional to a value obtained by multiplying the total stack number of the internal electrodes by a sum of the minimum distance $T_D$ between the internal electrodes and the maximum thickness $T_E$ of the internal electrode.

$T_D$ and ($T_D+T_R$) may each be the same as the minimum and maximum distances between the at least one first internal electrode 121 and the at least one second internal electrode 122. Therefore, the average distance between the at least one first internal electrode 121 and the at least one second internal electrode 122 may thus be dependent on the depth $T_R$ and width $W_R$ of a portion of the internal electrode, recessed by the recess portion 125.

The greater depth $T_R$ or width $W_R$ of the portion of the internal electrode, recessed by the recess portion 125, the larger average distance between the at least one first internal electrode 121 and the at least one second internal electrode 122. The greater depth $T_R$ of the portion of the internal electrode, recessed by the recess portion 125, the larger surface area between a surface of the internal electrode, on which the recess portion 125 is formed and the at least one dielectric layer 111. The reason is that the surface area may include not only the area in which the at least one first internal electrode 121 and the at least one second internal electrode 122 overlap each other but also a side surface of the recess portion 125.

The capacitance of the multilayer capacitor 100 may be formed based on an electric field between the at least one first internal electrode 121 and the at least one second internal electrode 122. Most of the electric field may be generated by the direction (e.g., T-direction) in which the at least one first internal electrode 121 and the at least one second internal electrode 122 are stacked on each other, and another electric field may be formed by a curved electric field factor such as a fringing effect generated at the side surface of the recess portion 125. Accordingly, the side surface of the recess portion 125 may also contribute to improvement of the capacitance.

The higher spatial efficiency of the electric field formed by the curved electric field factor, the higher improvement efficiency of the capacitance, by the curved electric field factor. The recess portion 125 may effectively improve the capacitance of the multilayer capacitor 100 when the improvement efficiency of the capacitance, by the curved electric field factor, is greater than a capacitance reduction factor due to the increased depth $T_R$ or width $W_R$ of the portion of the internal electrode, recessed by the recess portion 125.

The smaller $T_R$ and $W_R$ compared to $T_D$, the higher spatial efficiency of the electric field formed by the curved electric field factor. ($T_R/T_D$) and/or ($W_R/T_D$) may thus each fall within an appropriate range, thereby increasing the spatial efficiency of the electric field formed by the curved electric field factor, and effectively improving the capacitance of the multilayer capacitor 100.

Accordingly, the multilayer capacitor 100 according to an exemplary embodiment of the present disclosure may include the recess portion 125 in which ($T_R/T_D$) and/or ($W_R/T_D$) each satisfy the appropriate range, thereby increasing the improvement efficiency of the capacitance by the curved electric field factor (e.g., fringing effect) and efficiently increasing the capacitance compared to the overall size of the multilayer capacitor 100.

Figure 4B:
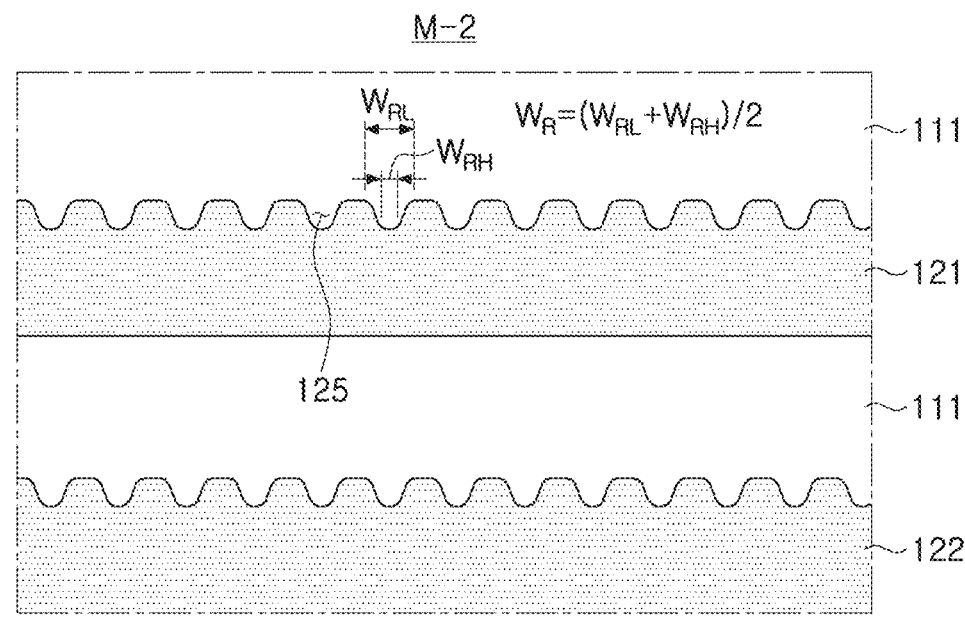
FIG. 4B is a cross-sectional view showing a modified shape of a recess portion of FIG. 4A.

FIG. 4B is a cross-sectional view showing a modified shape of a recess portion of FIG. 4A.

Referring to FIG. 4B, "M" in FIG. 3 may be implemented as M-2 in FIG. 4B according to a design of the capacitor, and a portion of the internal electrode, recessed by the recess portion 125 may include a relatively gentle inclination to have a maximum width $W_{RL}$ and a minimum width $W_{RH}$, and $W_R$ may have a value obtained by dividing, by two (2), a sum of the maximum width $W_{RL}$ and the minimum width $W_{RH}$ of the recess portion 125.

When the side surface of the recess portion 125 has a large inclination, an equation for calculating the width of the recess portion 125 may be slightly different from the above equation shown in FIG. 4B. For example, $W_R$ may have a value obtained by dividing the depth $T_R$ of the recess portion 125 by a value obtained by integrating $T_R$.

Figure 5A:
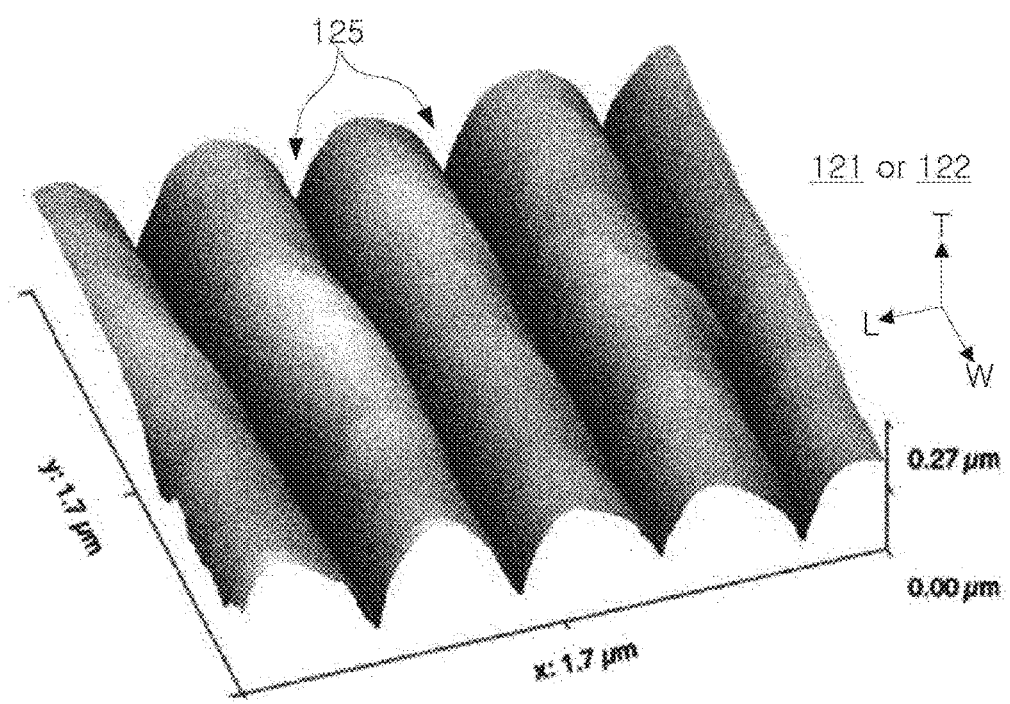
FIGS. 5A through 5C are photographs each showing the recess portion of the multilayer capacitor according to an exemplary embodiment of the present disclosure.
Figure 5B:
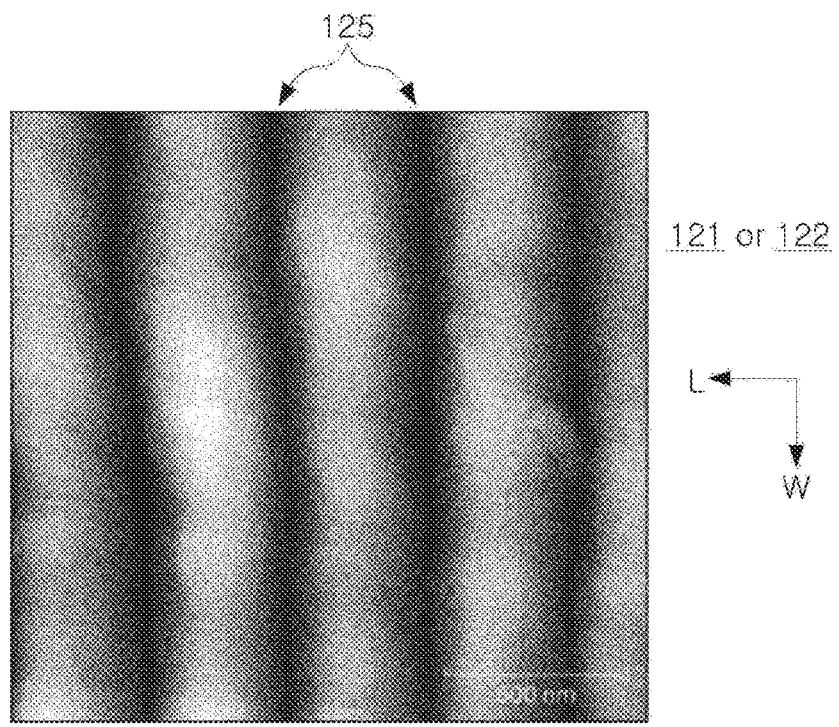
Figure 5C:
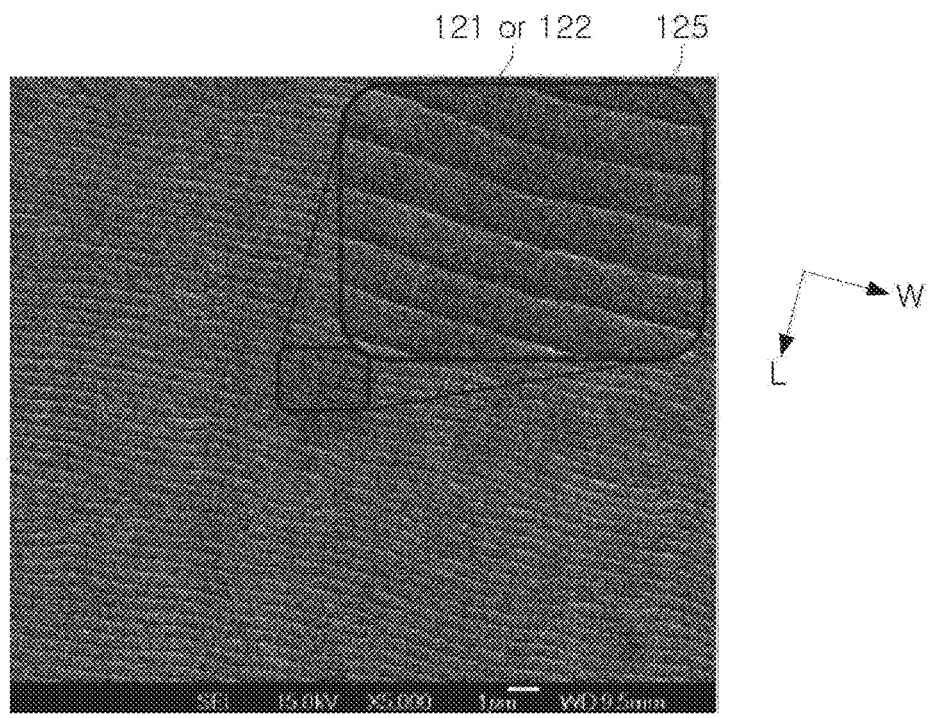

FIGS. 5A through 5C are photographs each showing the recess portion of the multilayer capacitor according to an exemplary embodiment of the present disclosure.

Referring to FIGS. 5A, 5B and 5C, at least some of the portions of the internal electrode, recessed by the recess portion 125, may have a shape of a plurality of recession lines extended parallel to each other.

$T_D$ in FIG. 4A may indicate the distance between the internal electrodes, based on the non-recessed portion positioned between the plurality of recession lines, $T_R$ in FIG. 4A may have a value obtained by dividing a sum of the respective depths of the plurality of recession lines by the number of the plurality of recession lines, and $W_R$ of FIG. 4A may have a value obtained by dividing a sum of the respective widths of the plurality of recession lines by the number of the plurality of recession lines.

When the LT plane obtained by measuring $T_D$, $T_R$, $T_E$ and $W_R$ is not perpendicular to the plurality of recession lines of the recess portion 125, the LT plane may be replaced by a plane slightly rotated to a direction of winding the T-direction to be perpendicular to the plurality of recession lines of the recess portion 125. Alternatively, $W_R$ may be obtained by multiplying or dividing the sin function or cos function of an angle formed between the L-direction obtained by a length-width (LW) plane and an extension direction of the plurality of recession lines of the recess portion 125 by the widths of the plurality of recession lines of the recess portion 125 based on the LT plane. FIGS. 5A, 5B, and 5C each show that the plurality of recession lines of the recess portion 125 are extended in the W-direction, and the present disclosure is not limited thereto.

FIGS. 6A through 6E are graphs each showing a capacitance characteristic of the capacitor (or Capa), based on $T_R$ and $T_D$ of FIG. 4A.

Referring to FIGS. 6A through 6D, when $T_D$ is 4 μm to 10 μm, capacitance Capa having $T_R$ greater than zero (e.g., $T_R=1$ μm) may be greater capacitance Capa having $T_R$ of zero.

Figure 6A:
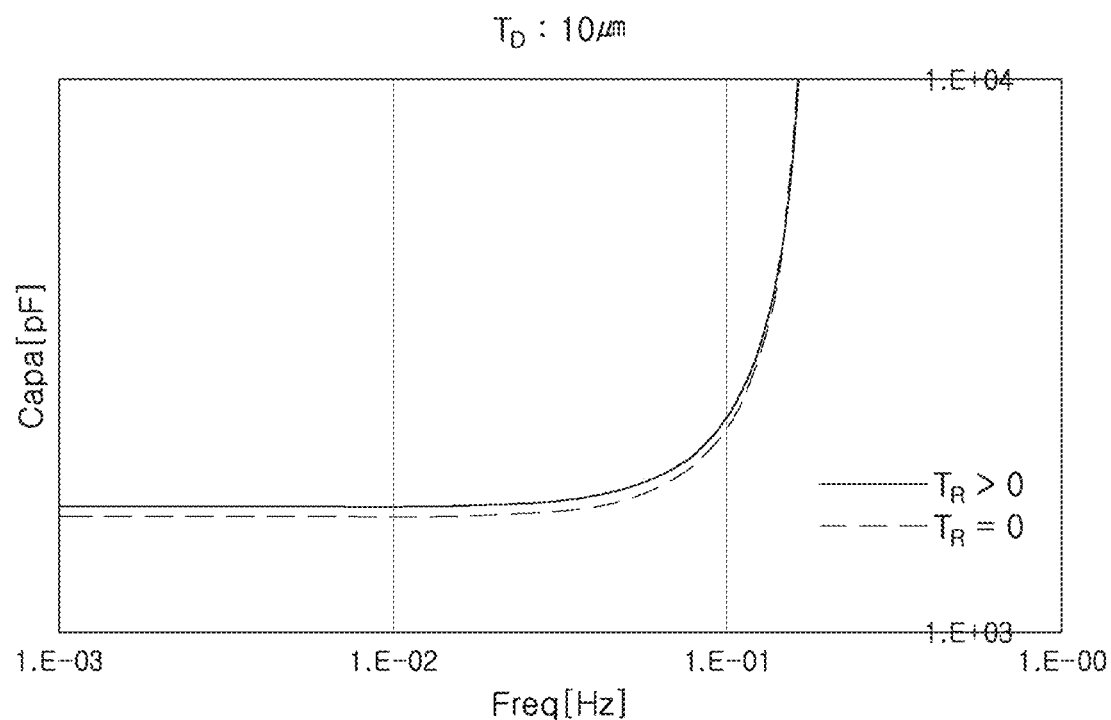
FIGS. 6A through 6E are graphs each showing a capacitance (Capa) characteristic of the capacitor, based on $T_R$ and $T_D$ of FIG. 4A.
Figure 6B:
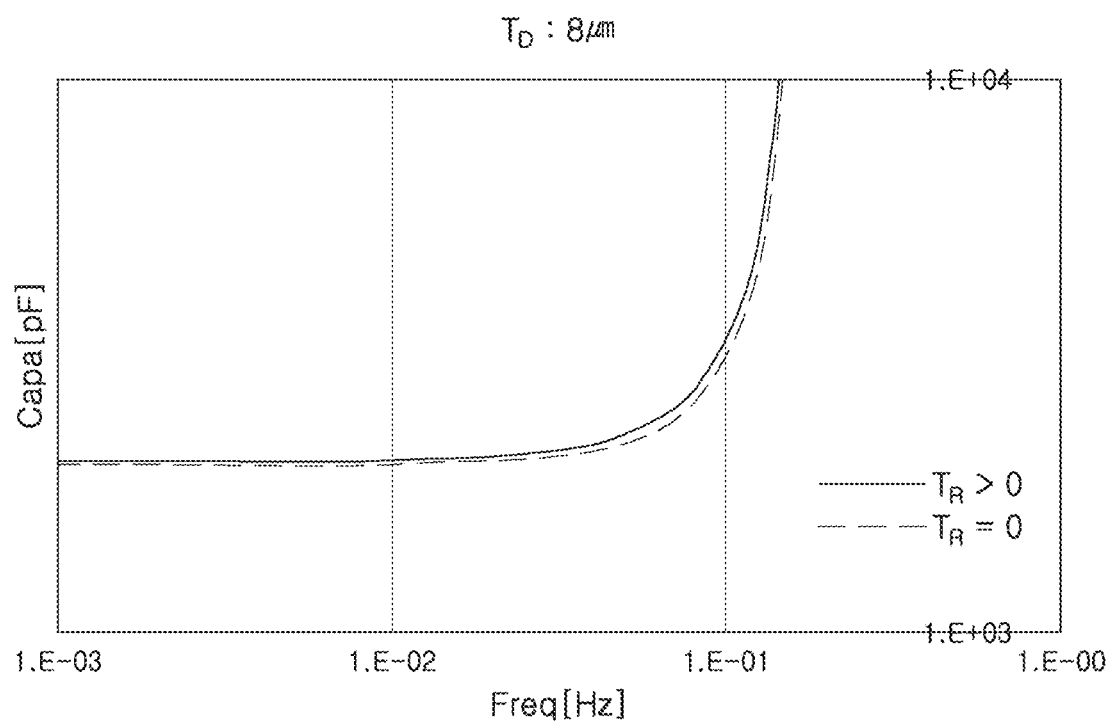
Figure 6C:
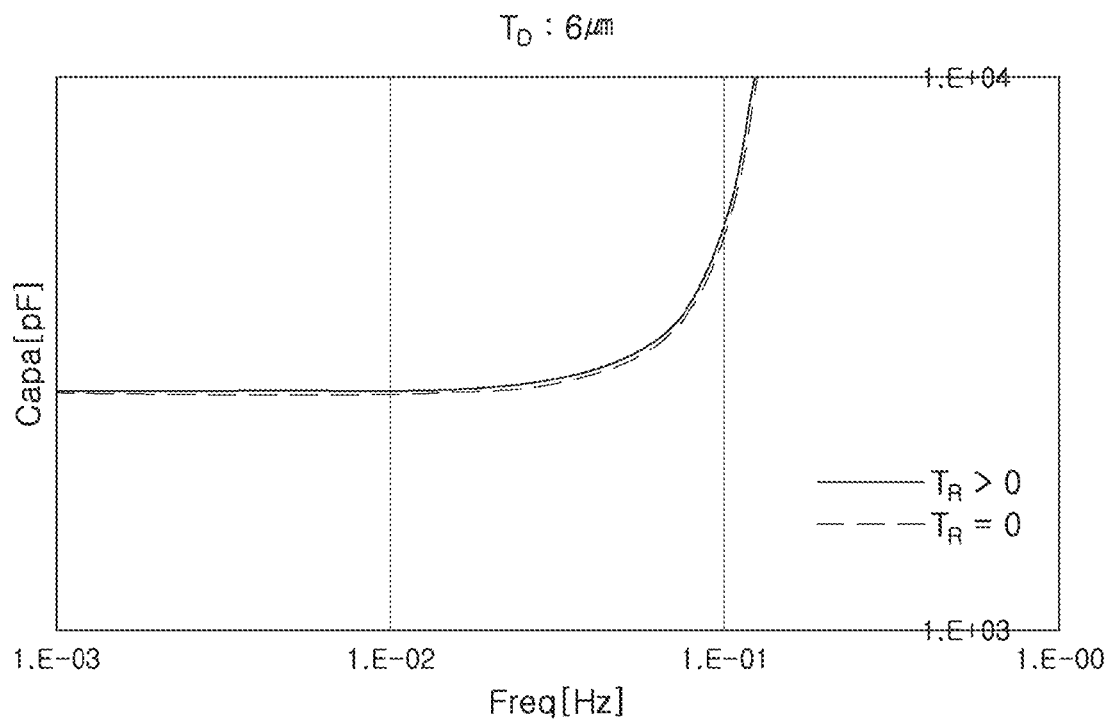
Figure 6D:
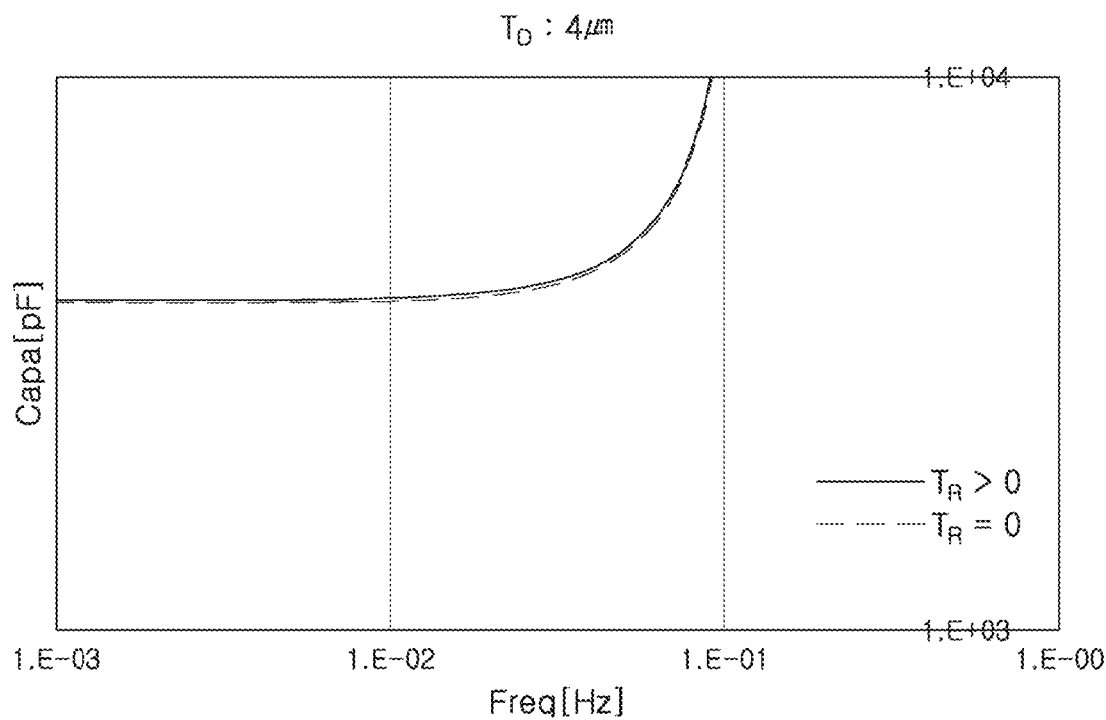
Figure 6E:
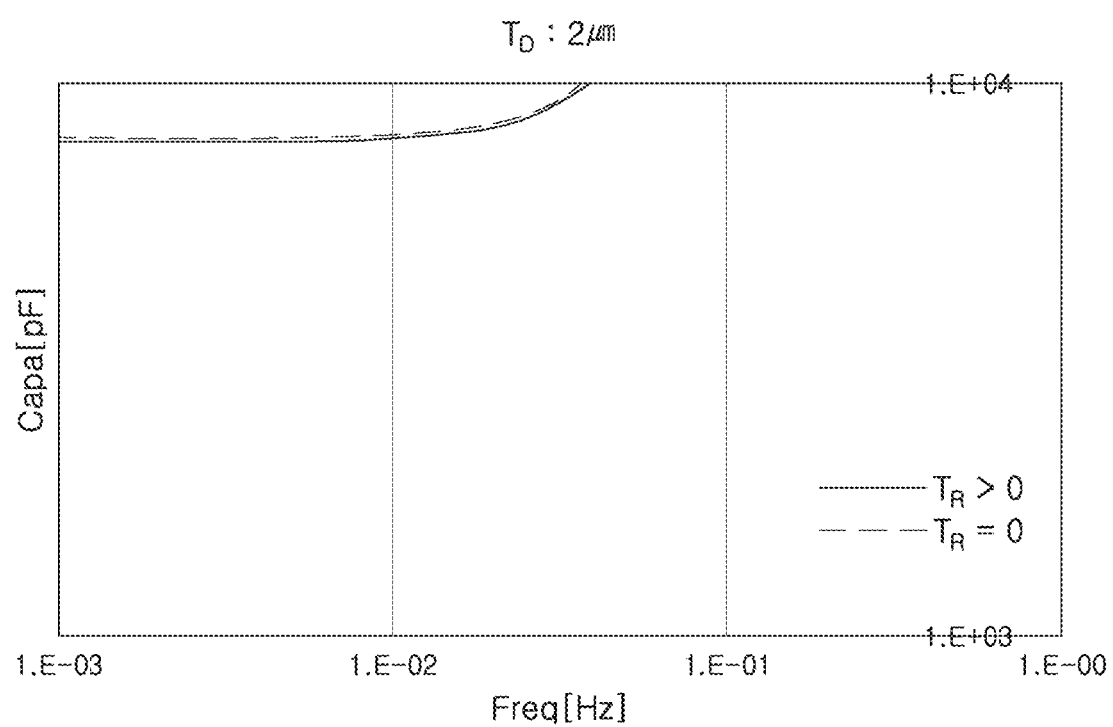

Referring to FIG. 6E, when $T_D$ is 2 μm, the capacitance Capa having $T_R$ greater than zero (e.g., $T_R=1$ μm) may be smaller than the capacitance Capa having $T_R$ of zero.

Accordingly, the multilayer capacitor according to an exemplary embodiment of the present disclosure may have $(T_R/T_D)$ greater than zero and less than (1 μm/2 μm), thereby effectively improving its capacitance.

Alternatively, the multilayer capacitor according to an exemplary embodiment of the present disclosure may have $(T_R/T_D)$ of (1 μm/10 μm) or more and (1 μm/4 μm) or less, thereby more stably securing improved performance of the capacitance.

For example, when the dielectric layer is made thin to have a thickness of 1 μm, $T_R$ may be (1 μm*(1 μm/10 μm)) or more and (1 μm*(1 μm/4 μm)) or less, or 0.1 μm or more and 0.25 μm or less. Accordingly, the multilayer capacitor according to an exemplary embodiment of the present disclosure may further improve a limit (e.g., material limit) in the capacitance improvement of a structure of the capacitor, which forms larger capacitance compared to its overall size.

The recess portion having $T_R$ of 0.1 μm or more and 0.25 μm or less may be a fine pattern, and may thus include $T_R$ precisely adjusted by laser irradiation (see FIG. 8B), and the present disclosure is not limited thereto.

When $T_R$ is 0.1 μm or more and 0.25 μm or less, 0.5 μm or more and 0.6 μm or less may be the maximum thickness $T_E$ of the internal electrode on one surface of which the recess portion is formed. The internal electrode may thus have a reduced delamination possibility, and improved connectivity.

Table 1 below shows an average value of each capacitance Capa shown in FIGS. 6A through 6E.

TABLE 1

| $T_D$ (μm) | Capa ($T_R = 0$) (pF) | Capa ($T_R = 1$ μm) (pF) | Increase rate (%) |
|---|---|---|---|
| 10 | 1616.975 | 1683.75 | 4.13 |
| 8 | 2002.957 | 2032.403 | 1.47 |
| 6 | 2635.246 | 2663.116 | 1.06 |
| 4 | 3891.349 | 3921.219 | 0.77 |
| 2 | 7666.723 | 7582.49 | −1.10 |

FIGS. 7A through 7E are graphs each showing a normalized capacitance of the capacitor (or Normalized Capa) based on $W_R$ and $T_D$ of FIG. 4A.

Figure 7A:
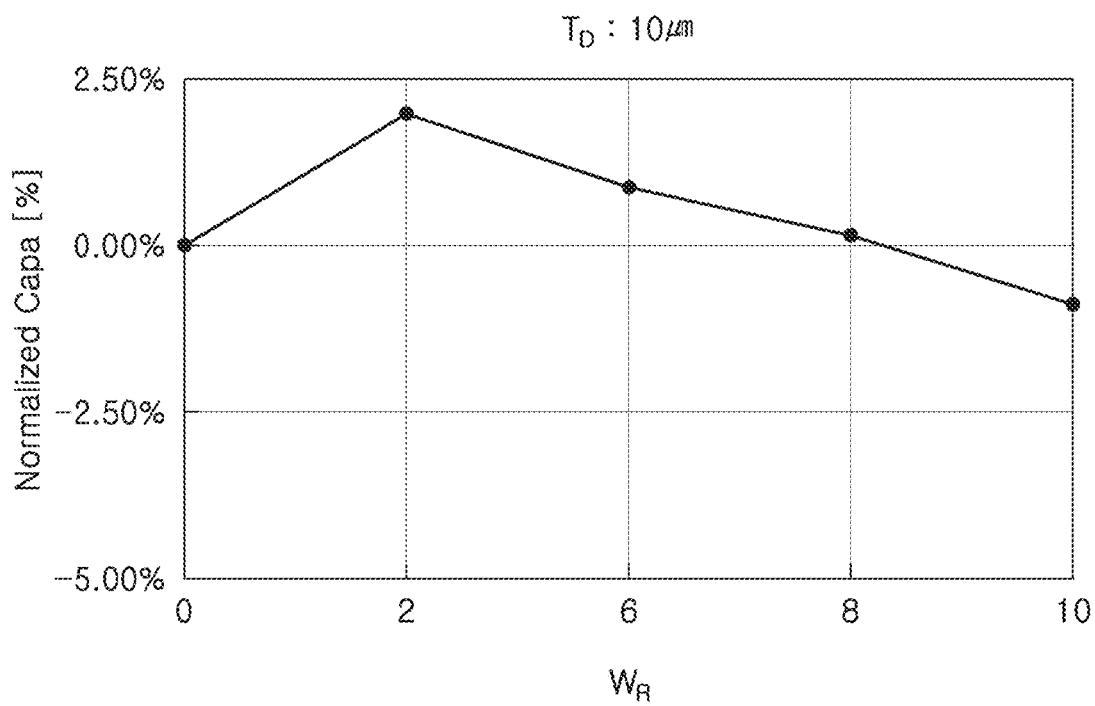
FIGS. 7A through 7E are graphs each showing a normalized capacitance (Capa) characteristic of the capacitor, based on $W_R$ and $T_D$ of FIG. 4A.
Figure 7B:
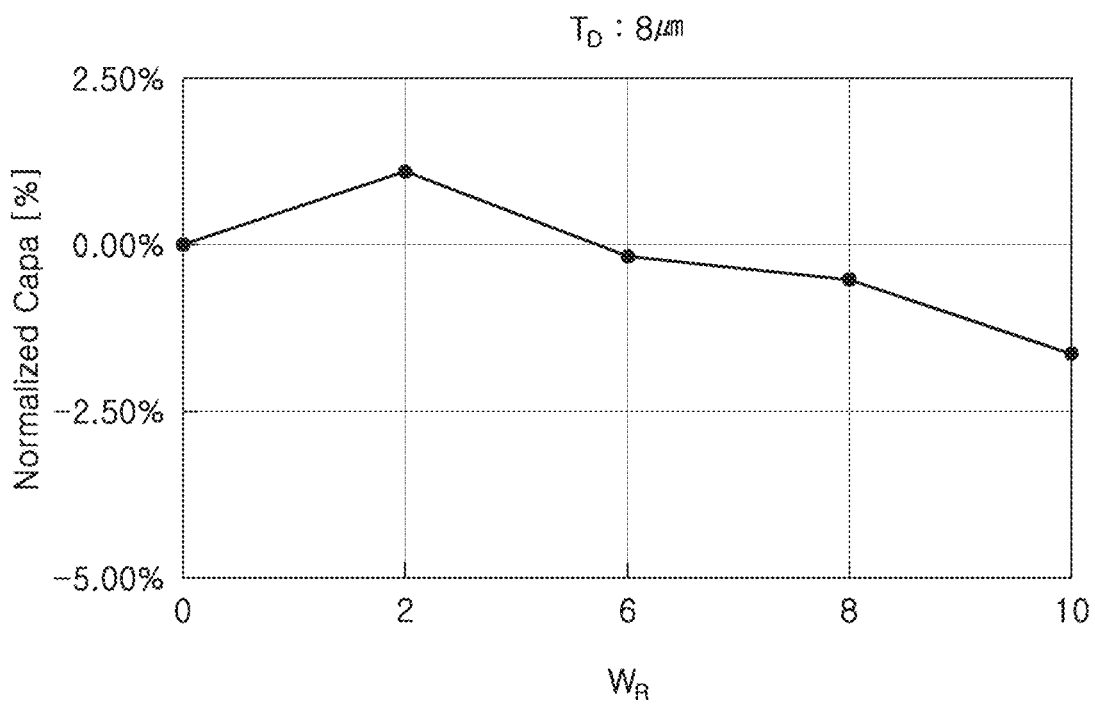
Figure 7C:
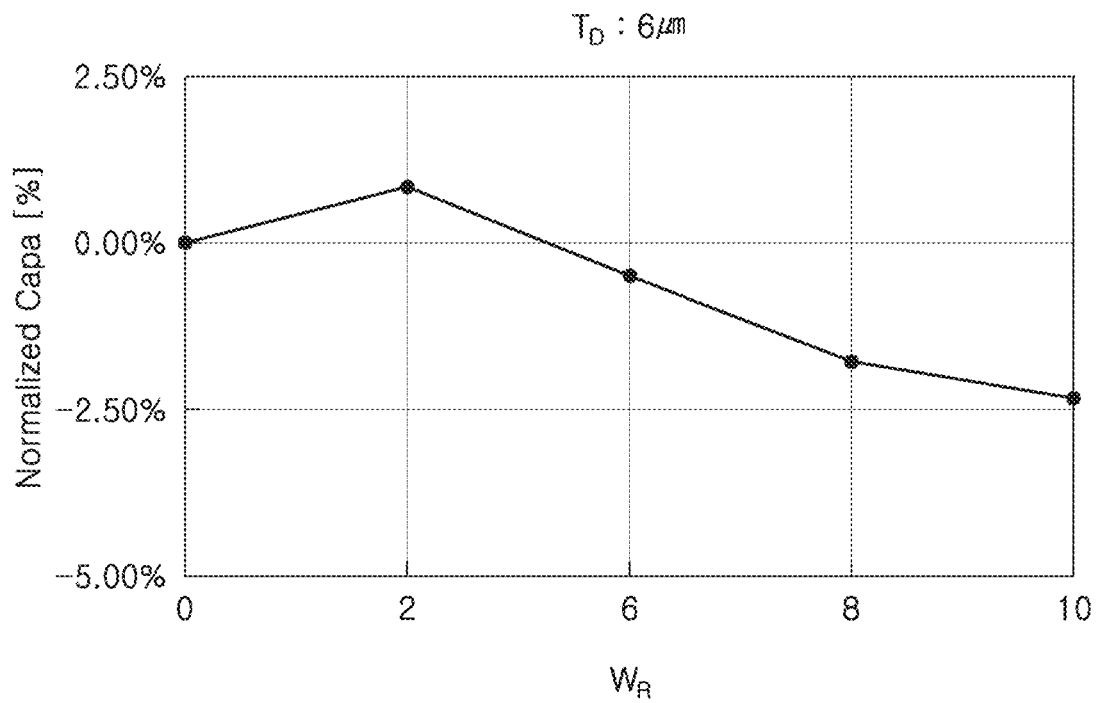

Referring to FIGS. 7A through 7C, when the $T_D$ is 6 μm to 10 μm, normalized capacitance (or Normalized Capa) having $W_R$ of 2 μm may be more than zero %. Here, the normalized capacitance (or Normalized Capa) may have a value obtained by dividing the capacitance of the capacitor when $W_R$ has a value corresponding to a point on the graph by the capacitance of the capacitor when the internal electrode has no recess portion.

Figure 7D:
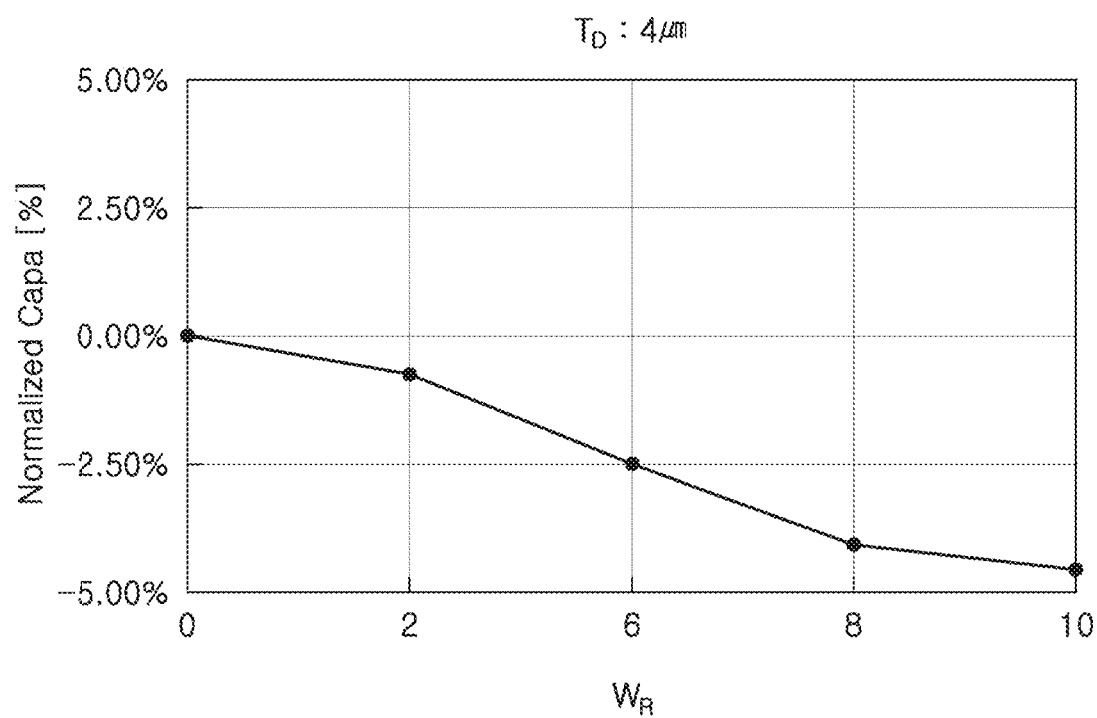
Figure 7E:
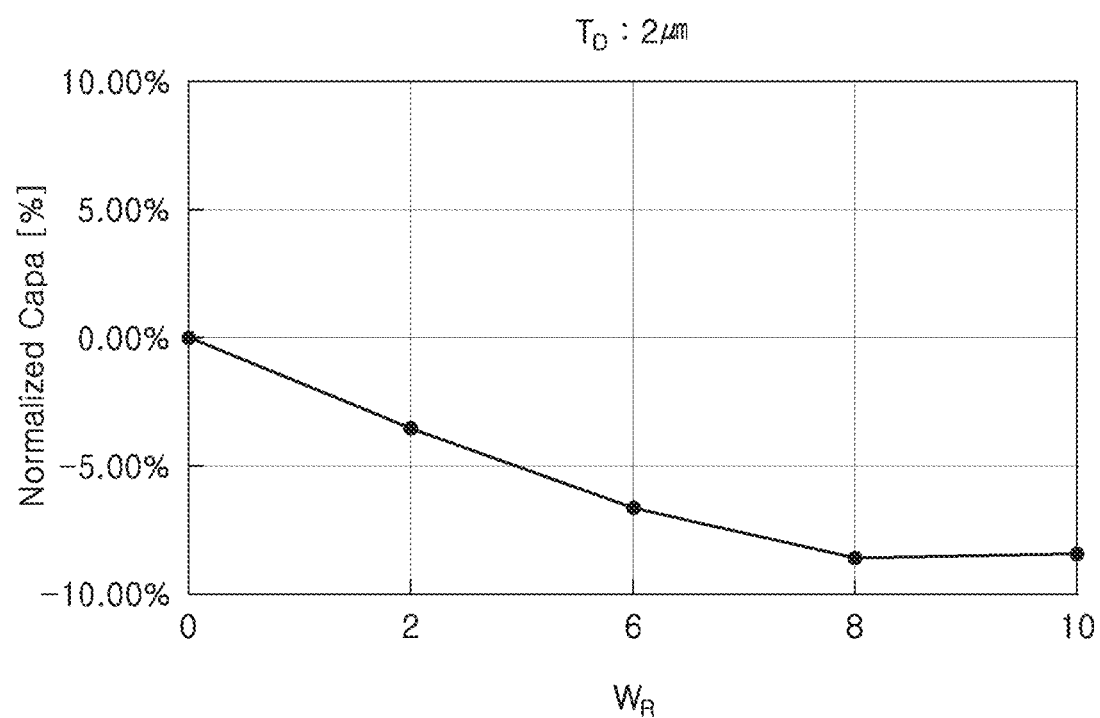

Referring to FIGS. 7D and 7E, when the $T_D$ is 2 μm to 4 μm, normalized capacitance (i.e., Normalized Capa) having $W_R$ of 2 μm may be less than zero %.

Accordingly, the multilayer capacitor according to an exemplary embodiment of the present disclosure may have $(W_R/T_D)$ more than zero and less than (2 μm/4 μm), thereby effectively improving its capacitance. Here, (2 μm/4 μm) may be (½).

For example, when the dielectric layer is made thin to have a thickness of 0.6 μm to 1 μm (i.e., 1/10 times $T_D$ in FIGS. 7A through 7C), $W_R$ may be 0.2 μm or less (i.e., 1/10 times $W_R$ in FIGS. 7A through 7C). Accordingly, the multilayer capacitor according to an exemplary embodiment of the present disclosure may further improve the limit (e.g., material limit) in the capacitance improvement of the structure of the capacitor, which forms the larger capacitance compared to its overall size.

Alternatively, the multilayer capacitor according to an exemplary embodiment of the present disclosure may have $(W_R/T_D)$ of (2 μm/10 μm) or more (2 μm/6 μm) or less, thereby more stably securing the improved performance of the capacitance. Here, (2 μm/10 μm) may be (⅕), and (2 μm/6 μm) may be (⅓).

A median vale of $(T_R/T_D)$ according to FIGS. 6A through 6E may be in a range of about 0.175 to 0.25, and a median value of $(W_R/T_D)$ according to FIGS. 7A through 7E may be in a range of about 0.25 to 0.265. $(T_R/T_D)$ and $(W_R/T_D)$ may have the same denominator. Accordingly, a median value of $W_R$ may be greater than a median value of $T_R$, and $W_R$ may be greater than $T_R$. The multilayer capacitor according to an exemplary embodiment of the present disclosure may have $W_R$ greater than $T_R$, thereby efficiently improving its capacitance.

Figure 8A:
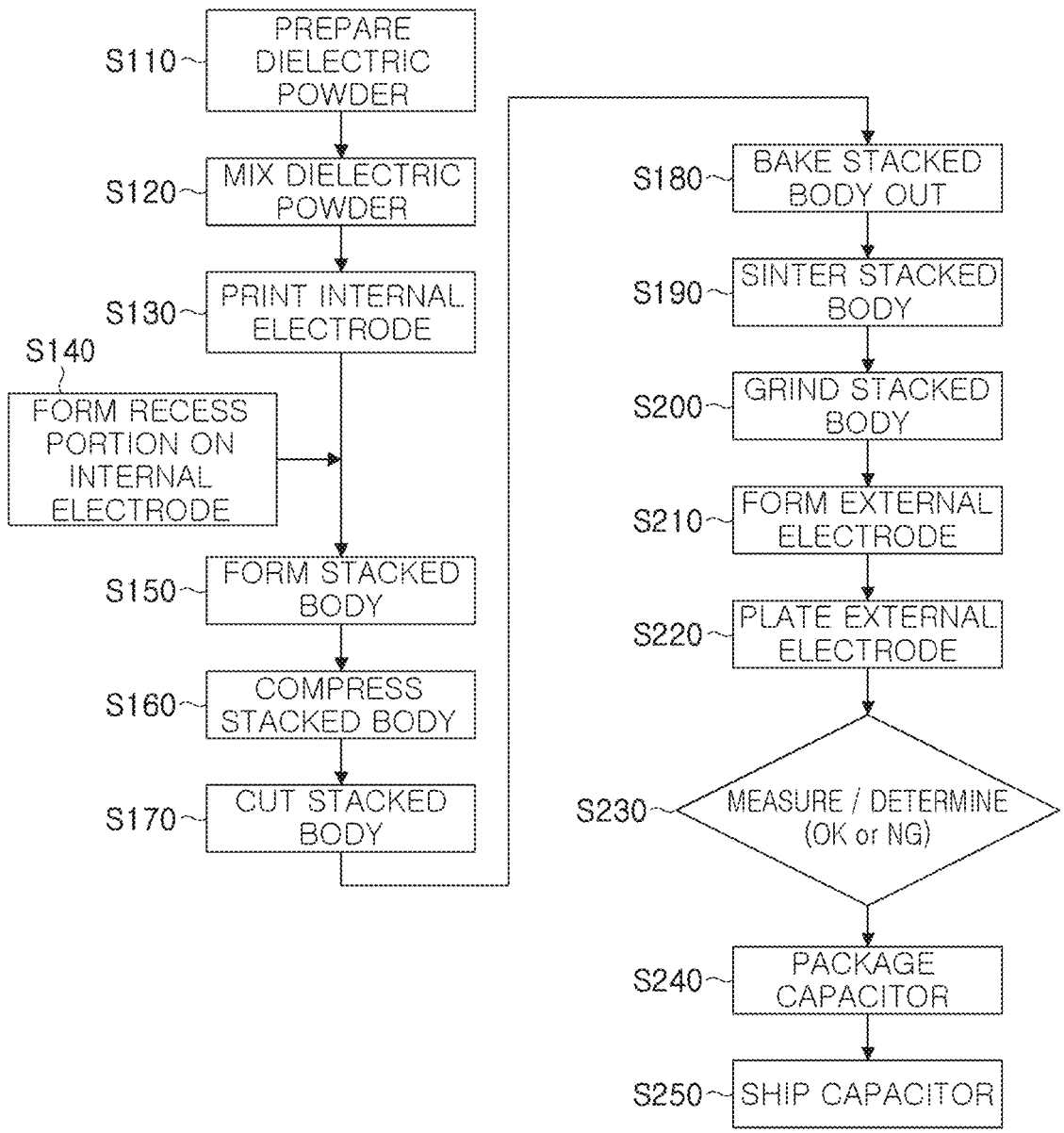
FIG. 8A is a flowchart showing a method of manufacturing a multilayer capacitor according to an exemplary embodiment of the present disclosure.

FIG. 8A is a flowchart showing a method of manufacturing a multilayer capacitor according to an exemplary embodiment of the present disclosure.

Referring to FIG. 8A, a method of manufacturing the multilayer capacitor according to an exemplary embodiment of the present disclosure may include at least some of the following procedures: preparing dielectric powder (e.g., ceramic powder) (S110); forming a dielectric layer by mixing at least one of an additive, an organic solvent, a plasticizer, a binder and a dispersant with the dielectric powder (S120); printing the internal electrode by printing a conductive paste (S130); forming a stacked body by alternately stacking the dielectric layer and the internal electrode on each other in the first direction (e.g., T-direction) to form a laminate (S150); compressing the stacked body in the first direction (e.g., T-direction) (S160); cutting the stacked body in the LT plane and/or the LW plane (S170); baking the stacked body out (S180); sintering the stacked body (S190); completing the body by grinding an edge of the stacked body (S200); forming the external electrode on either side of the body (S210); plating a surface of the external electrode (S220); measuring a voltage of the external electrode by applying the voltage thereto, and determining whether a product has a good quality based on the measured value (S230); packaging the multilayer capacitor having the good quality (S240); and shipping the multilayer capacitor having the good quality (S250). Here, the method of manufacturing the multilayer capacitor according to an exemplary embodiment of the present disclosure may further include forming the recess portion on the internal electrode (S140).

When the recess portion is formed on the internal electrode instead of the dielectric layer, ($T_R/T_D$) and/or ($W_R/T_D$) may be more precisely adjusted, thus more stably improving the capacitance of the capacitor. In addition, a process of forming the recess portion may have little effect on an internal structure (e.g., change in internal structure or physical property) of the dielectric layer, thus stably securing performance (e.g., dielectric constant, withstand voltage, and strength) of the dielectric layer.

Figure 8B:
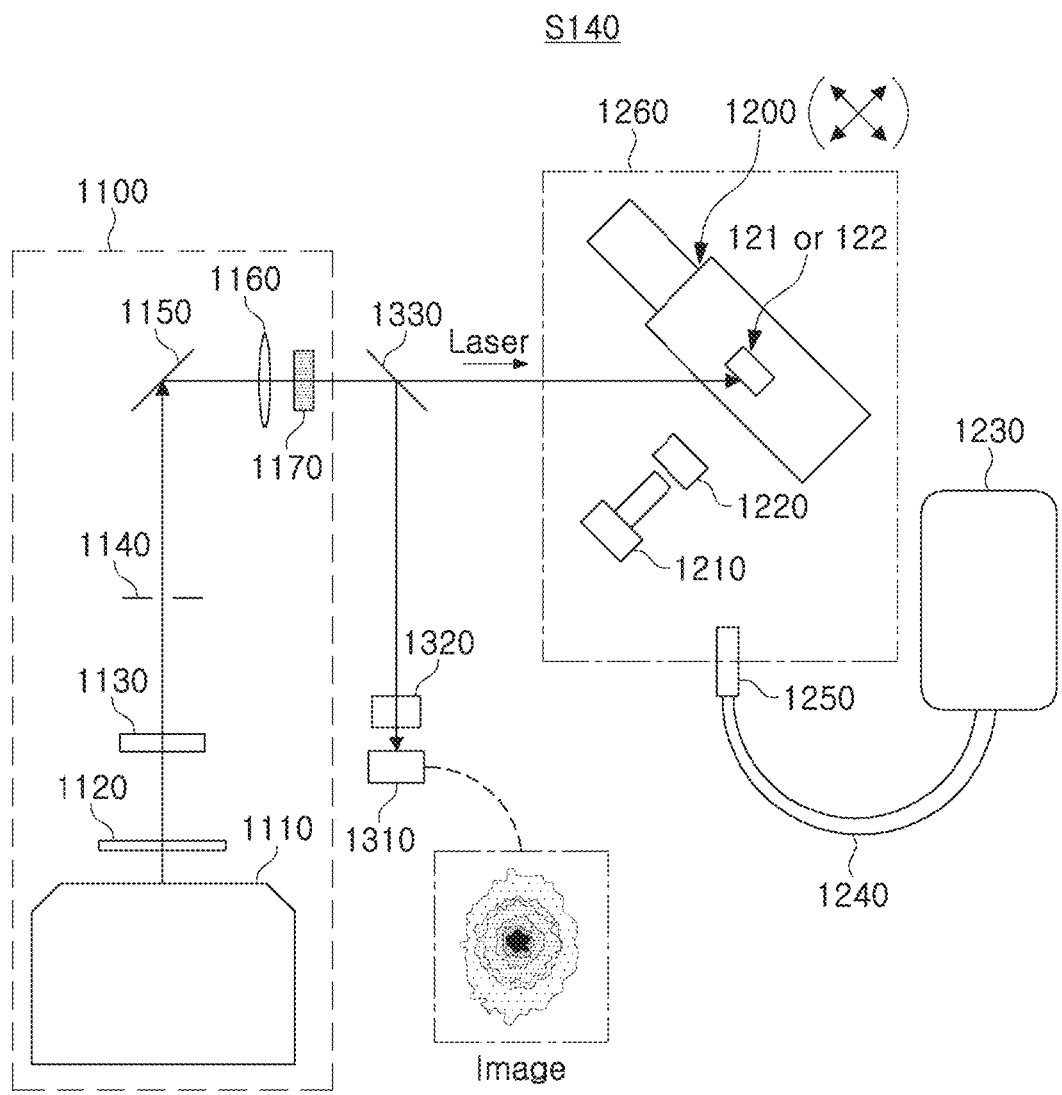
FIG. 8B is a view showing a laser irradiation method for forming a recess portion of a multilayer capacitor according to an exemplary embodiment of the present disclosure.

FIG. 8B is a view showing a laser irradiation method for forming a recess portion of a multilayer capacitor according to an exemplary embodiment of the present disclosure.

Referring to FIG. 8B, the internal electrode 121 or 122, or a dielectric green sheet, on which the internal electrode 121 or 122 is formed, may be disposed on a mover 1200 disposed in a room 1260 having a specific gas (e.g., dinitrogen $N_2$) atmosphere, a laser output device 1100 may irradiate a laser to the mover 1200, and the mover 1200 may be moved in a direction perpendicular to a direction in which the laser is irradiated. It is thus possible to form the recess portion of the multilayer capacitor.

For example, the laser output device 1100 may form a femtosecond laser pulse through a sapphire 1110 doped with titanium (Ti), and the laser pulse may pass through a ½ wavelength wave plate 1120, a polarizer 1130, an aperture 1140, a mirror 1150, a lens 1160, a power meter 1170 and a beam splitter 1330 to be irradiated to the mover 1200 as the laser. A feedback laser partially split by the beam splitter 1330 may be analyzed by an attenuator 1320 and a camera 1310, and a result of the analysis may be used as information for adjusting an output energy and/or wavelength of the laser output device 1100.

For example, $T_D$, $T_R$, $T_E$ and $W_R$ in FIG. 4A may be precisely adjusted by adjusting the energy magnitude and/or wavelength of the laser pulse output by the laser output device 1100. In one example, the formed recess portion 125 may include a plurality of recession lines or recession patterns periodically arranged a surface of one or each of the first internal electrode and the second internal electrode. For example, recession lines or recession patterns may have a constant pitch, although the present disclosure is not limited thereto.

A fiber lamp 1230 may provide the room 1260 with visible and/or infrared light via a fiber 1240 and an emitter 1250, and an attenuator 1220 and a camera 1210 in the room 1260 may obtain an image used to analyze the information for adjusting the movement of the mover 1200.

FIG. 8B shows a laser-induced periodic surface structures (LIPSS) method, which is an example of a method of forming the recess portion, and the present disclosure is not limited thereto.

As set forth above, the multilayer capacitor according to an exemplary embodiment of the present disclosure may efficiently-improve its performance (e.g., capacitance or miniaturization).

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
   a body including a stack structure in which a first internal electrode and a second internal electrode are stacked on each other interposing a dielectric layer therebetween; and
   first and second external electrodes disposed on the body while being spaced apart from each other in a length direction of the body to be respectively connected to the first internal electrode and the second internal electrode,
   wherein one of the first internal electrode and the second internal electrode includes a recess portion disposed in a first surface of the one of the first internal electrode and the second internal electrode, having a line-shaped portion extending in a width direction perpendicular to the length direction, and providing a deviation in a distance between the first and second internal electrodes,
   $T_D$ indicates a thickness of a portion of the dielectric layer, based on a portion positioned on the first surface and not in the recess portion,
   $T_R$ indicates a recession depth of a portion positioned on the first surface and recessed by the recess portion, and
   ($T_R/T_D$) is greater than zero and less than (½).

2. The multilayer capacitor of claim 1, wherein the dielectric layer includes a barium titanate ($BaTiO_3$)-based ceramic dielectric, and
   the recess portion is formed by laser irradiation.

3. The multilayer capacitor of claim 1, wherein at least portions of the one of the first and second internal electrodes, recessed by the recess portion, have a shape of a plurality of recession lines extended parallel to each other,
   $T_D$ indicates the thickness of the dielectric layer between the first and second internal electrodes, based on the non-recessed portion positioned between the plurality of recession lines, and
   $T_R$ has a value obtained by dividing a sum of respective depths of the plurality of recession lines by the number of the plurality of recession lines.

4. The multilayer capacitor of claim 1, wherein ($T_R/T_D$) is (1/10) or more and (¼) or less.

5. The multilayer capacitor of claim 1, wherein $T_R$ is 0.1 μm or more and 0.25 μm or less.

6. The multilayer capacitor of claim 5, wherein 0.5 μm or more and 0.6 μm or less is a maximum thickness $T_E$ of the one of the first and second internal electrodes, based on the portion positioned on the first surface and not recessed by the recess portion.

7. The multilayer capacitor of claim 1, wherein $W_R$ indicates a linear width of at least one of the portions of the of the first and second internal electrodes, recessed by the recess portion, and
   ($W_R/T_D$) is greater than zero and less than (½).

8. The multilayer capacitor of claim 7, wherein ($W_R/T_D$) is (⅕) or more and (⅓) or less, and
   $W_R$ is 0.2 μm or less.

9. The multilayer capacitor of claim 7, wherein $W_R$ is greater than $T_R$.

10. A multilayer capacitor comprising:
    a body including a stack structure in which a first internal electrode and a second internal electrode are stacked on each other interposing a dielectric layer therebetween; and
    first and second external electrodes disposed on the body while being spaced apart from each other in a length direction of the body to be respectively connected to the first internal electrode and the second internal electrode,
    wherein one of the first internal electrode and the second internal electrode includes a recess portion disposed in a first surface of the one of the first internal electrode and the second internal electrode, having a line-shaped portion extending in a width direction perpendicular to the length direction, and providing a deviation in a distance between the first and second internal electrodes, $T_D$ indicates a thickness of a portion of the dielectric layer, based on a portion positioned on the first surface and not in the recess portion, $W_R$ indicates a linear width of at least one of portions of the one of the first internal electrode and the second internal electrode, recessed by the recess portion, and ($W_R/T_D$) is greater than zero and less than (½).

11. The multilayer capacitor of claim 10, wherein ($W_R/T_D$) is (⅕) or more and (⅓) or less.

12. The multilayer capacitor of claim 10, wherein $W_R$ is 0.2 μm or less.

13. The multilayer capacitor of claim 10, wherein at least portions of the one of the first internal electrode and the second internal electrode, recessed by the recess portion, have a shape of a plurality of recession lines extended parallel to each other, $T_D$ indicates the thickness of the dielectric layer between the first and second internal electrodes, based on the non-recessed portion positioned between the plurality of recession lines, and $W_R$ has a value obtained by dividing a sum of respective widths of the plurality of recession lines by the number of the plurality of recession lines.

14. The multilayer capacitor of claim 10, wherein the dielectric layer includes a barium titanate ($BaTiO_3$)-based ceramic dielectric, and the recess portion is formed by laser irradiation.

15. A multilayer capacitor comprising:

a body including a stack structure in which a first internal electrode and a second internal electrode are stacked on each other interposing a dielectric layer therebetween;

first and second external electrodes disposed on the body while being spaced apart from each other in a length direction of the body to be respectively connected to the first internal electrode and the second internal electrode, wherein one of the first internal electrode and the second internal electrode includes a recess portion disposed in a first surface of the one of the first internal electrode and the second internal electrode, having a line-shaped portion extending in a width direction perpendicular to the length direction, and providing a deviation in a distance between the first and second internal electrodes, $W_R$ indicates a linear width of at least one of portions of the one of the first internal electrode and the second internal electrode, recessed by the recess portion, $T_R$ indicates a recession depth of a portion positioned on the first surface and recessed by the recess portion, and $W_R$ is greater than $T_R$.

16. The multilayer capacitor of claim 15, wherein $T_R$ is 0.1 μm or more and 0.25 μm or less, and $W_R$ is 0.2 μm or less.

17. A multilayer capacitor comprising:

a body including a stack structure in which a first internal electrode and a second internal electrode are stacked on each other interposing a dielectric layer therebetween; and first and second external electrodes disposed on the body while being spaced apart from each other in a length direction of the body to be respectively connected to the first internal electrode and the second internal electrode, wherein one of the first internal electrode and the second internal electrode includes a plurality of line-shaped recession patterns periodically arranged on a portion of a first surface of the one of the first internal electrode and the second internal electrode and extending in a width direction perpendicular to the length direction.

18. The multilayer capacitor of claim 17, wherein the plurality of recession patterns extend parallel to each other.

19. The multilayer capacitor of claim 17, wherein among the first surface of the one of the first internal electrode and the second internal electrode and a second surface of the one of the first internal electrode and the second internal electrode opposing the first surface, the plurality of recession patterns are disposed on only one surface.

* * * * *